Dec. 3, 1946.  T. VIGMOSTAD ET AL  2,411,945
VEHICLE BODY
Filed Sept. 27, 1941  3 Sheets-Sheet 1
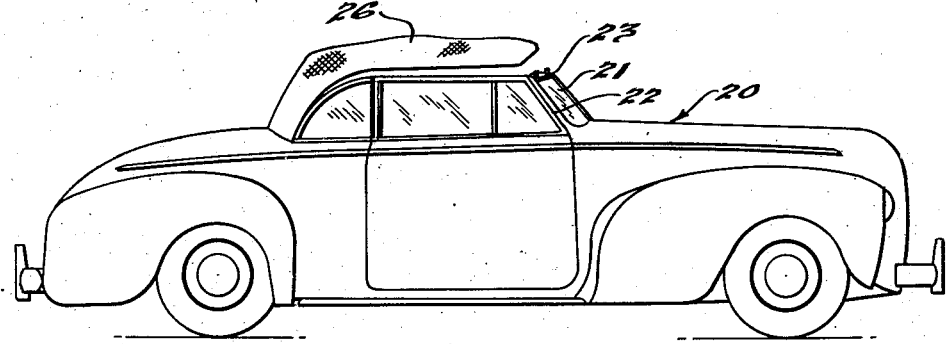
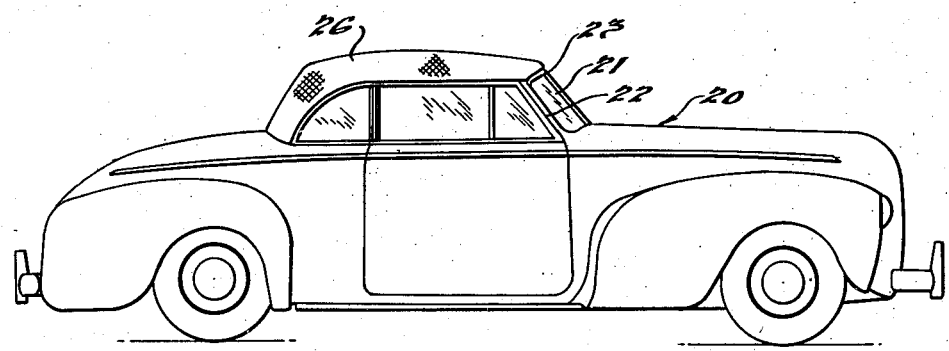
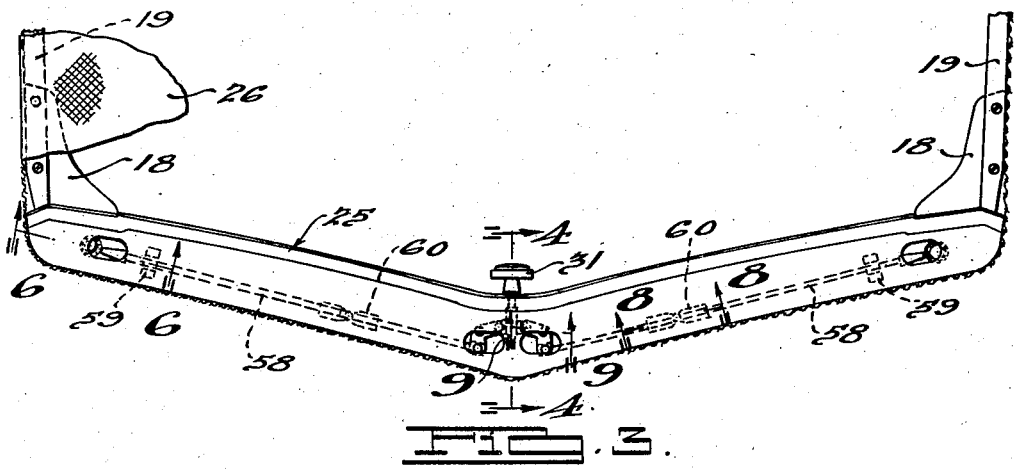
INVENTORS.
Trygve Vigmostad,
Soren N. Juul.
BY Gray and Smith
ATTORNEYS

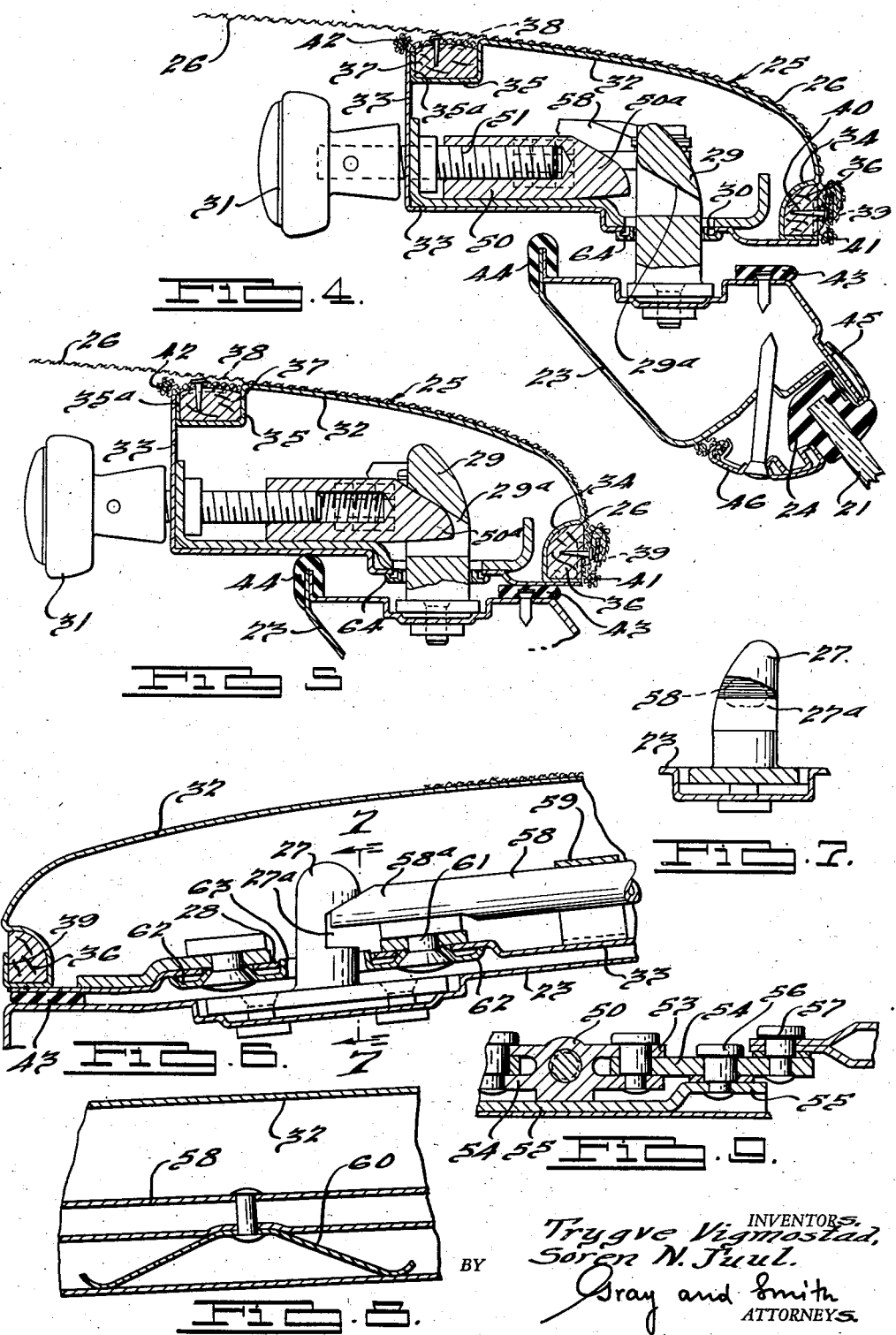

Dec. 3, 1946.　　T. VIGMOSTAD ET AL　　2,411,945
VEHICLE BODY
Filed Sept. 27, 1941　　3 Sheets-Sheet 3
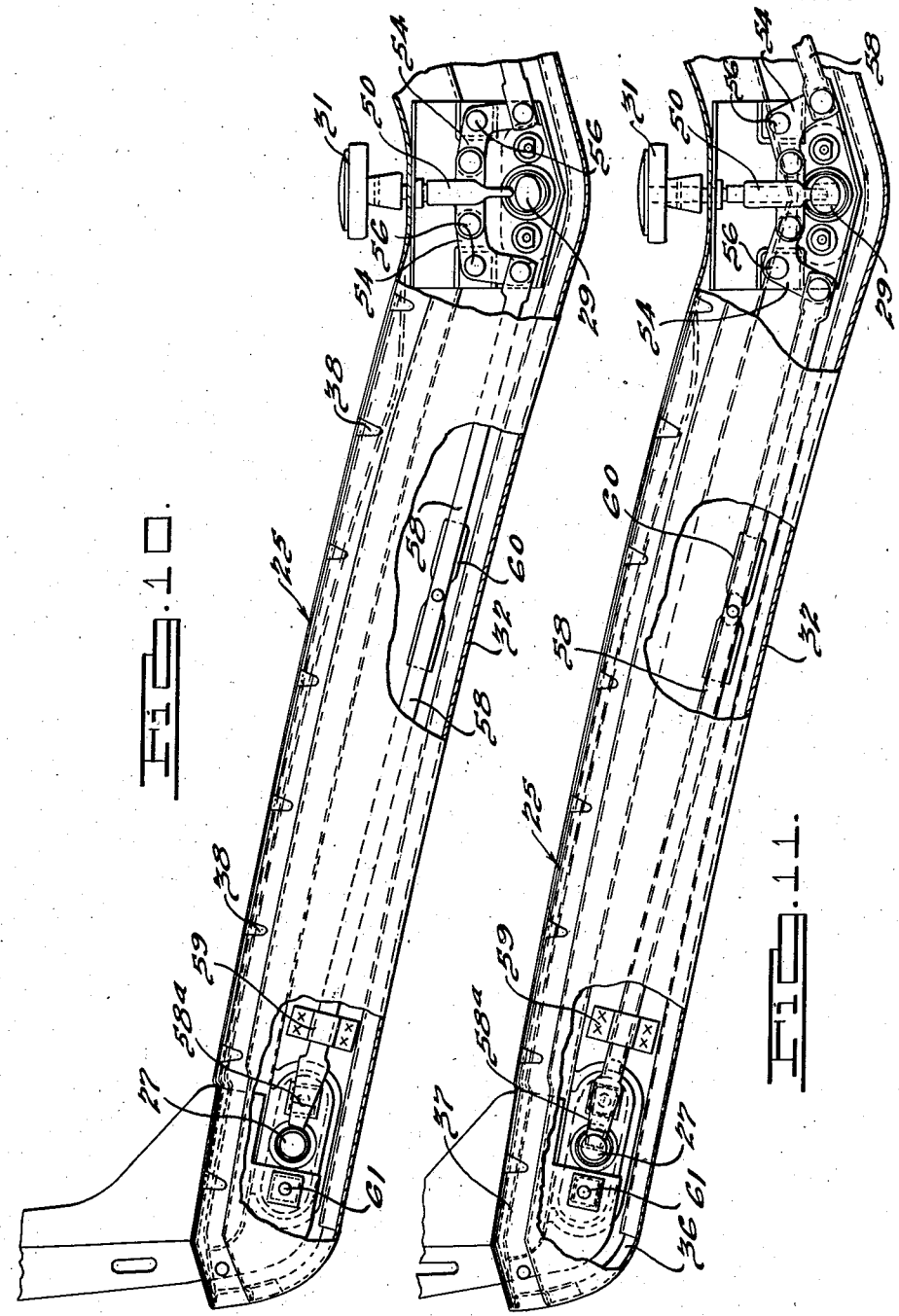
INVENTORS.
Trygve Vigmostad,
Soren N. Juul.
BY
Gray and Smith
ATTORNEYS.

Patented Dec. 3, 1946

2,411,945

REISSUED

UNITED STATES PATENT OFFICE 2,411,945

VEHICLE BODY

Trygve Vigmostad and Soren N. Juul, Detroit, Mich., assignors to Briggs Manufacturing Company, Detroit, Mich., a corporation of Michigan Application September 27, 1941, Serial No. 412,538

6 Claims. (Cl. 296—120)

This invention relates to vehicle bodies and more particularly to motor vehicle bodies of the convertible type.

Serious difficulties have been experienced with the bodies of this type and particularly with the devices for locking collapsible or foldable tops thereof to the rigid parts of the body structure.

It is one of the objects of the present invention to provide an improved motor vehicle body of the convertible type having means for positively locking and unlocking the collapsible top of a vehicle body to the front thereof.

Another object of the invention is to provide a vehicle body of the above specified character having locking means including a plurality of locking devices which are simultaneously actuated in a simplified manner.

A further object of the invention is to provide an improved locking means including a plurality of locking devices which can be operated from the driver's seat and without leaving the same, and which can be locked and unlocked quickly and easily, and with the aid of a single control member or handle.

A still further object of the invention is to provide an improved locking means for a convertible motor vehicle body, which means are of the positive type and which enable a secure and tight locking of the foldable top header to the rigid portion of the body, and in which the tightness of the lock is not affected by the wear of the locking members.

A still further object of the present invention is to provide an improved motor vehicle body of the convertible type including locking means which, with the exception of control members, are entirely concealed from view and have no exposed parts which are unsightly and which, being located close to the passenger's head, might otherwise be a source of serious injury even in a minor collision.

A still further object of the invention is to provide an improved motor vehicle body of the convertible type, means being provided therein to effect weather seal between the connected parts of the foldable top and the rigid body parts.

A still further object of the invention is to provide an improved vehicle body of the convertible type in which various mechanisms necessary for proper operation of the foldable top are concealed in large members having pleasing streamline appearance and light weight.

It is an added object of the present invention to provide an improved structure of the foregoing character which is simple in construction, safe and dependable in operation, and is relatively inexpensive to manufacture.

Other objects of this invention will appear in the following description and appended claims, reference being had to the accompanying drawings forming a part of this specification wherein like reference characters designate corresponding parts in the several views.

Fig. 1 is a side view of a motor vehicle having a body of the convertible type embodying the present invention, the foldable top being shown unlocked and about to be folded toward the rear of the vehicle.

Fig. 2 is a view similar in part to Fig. 1, the foldable top being shown locked to the windshield structure of the vehicle.

Fig. 3 is a fragmentary plan view of the front portion of the foldable top with the canvas cover thereof being removed to show the header member in plan view.

Fig. 4 is a vertical sectional view taken through the center of the foldable top header, the view being taken in the direction of the arrows, with the sectional plane passing through the line 4—4 of Fig. 3, the foldable top header being shown ready to be locked to the windshield member.

Fig. 5 is a view similar in part to Fig. 4, the operative parts being shown in position when the foldable top header is locked to the windshield member.

Fig. 6 is a sectional view taken in the direction of the arrows on the section plane passing through the line 6—6 of Fig. 3, said view showing one end of the top header on an enlarged scale and locked to the windshield member.

Fig. 7 is a sectional view taken in the direction of the arrows on the section plane passing through the line 7—7 of Fig. 6 and showing one of the dowels carried by the windshield member.

Fig. 8 is a sectional view taken in the direction of the arrows on the section plane passing through the line 8—8 of Fig. 7 and showing one of the anti-rattle springs carried by the locking rods.

Fig. 9 is a sectional view taken in the direction of the arrows on the section plane passing through the section line 9—9 of Fig. 3.

Fig. 10 is a view similar in part to Fig. 3 and showing the right hand portion of the foldable top header with parts of the header being broken away to show the relative position of the locking means, the header being shown unlocked.

Fig. 11 is a view similar in part to Fig. 10 showing the relative positions of the locking means when the foldable top header is locked to the windshield member.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown, by way of example, a motor vehicle having a body of the convertible type embodying the present invention.

Referring to the drawings and more particularly to Figs. 1 and 2 thereof, the numeral 20 indicates the motor vehicle having a windshield 21 arranged between two windshield posts 22 rigidly secured to the body of the vehicle at the sides thereof, as illustrated. Between the posts 22 there is arranged a transverse member 23 of a hollow construction. A rubber strip 24 is provided between the windshield 21 and the transverse member 23 to seal the same and prevent rattling.

The body is of the so-called convertible type and has a collapsible or foldable top which may be folded to the rear of the vehicle, opening the passenger compartment thereof from the top. In accordance with the objects of the present invention there are provided improved means whereby the front of the collapsible or foldable top may be secured or locked quickly to said transverse member 23, thus rigidly connecting said top to the body structure. A transversely extending foldable top header 25 is of a hollow construction and is made preferably of sheet metal by stamping operations. The ends of the header 25 are secured with the aid of suitable brackets 18 to the ends of the side members 19 of the foldable top frame. The frame itself does not form a part of the present invention, and the description of its construction and operation is omitted for this reason. To the lower front edge of the header 25 there is securely fastened a foldable top 26 made of any suitable material such as canvas.

In accordance with the invention the windshield member 23 is provided with two outer dowels or pins 27 adapted to enter corresponding openings 28 provided in the header 25 and a central dowel or pin 29 entering an opening 30 provided in the center of the header 25. Improved locking means are operatively arranged within the hollow foldable top header 25, and they are adapted to be controlled or operated by a single control member or handle 31 manually operable from the operator's or driver's seat.

The hollow body of the foldable top header 25 is of a flat V type to correspond to the V type or form of the windshield 21. Said hollow body of the header 25 comprises generally a front piece 32 and a rear or lower piece 33 secured together in any suitable manner, such as with the aid of spot welding. In the front piece 32 there are formed two channels 34 and 35. The front channel 34 carries a front tacking strip 36, while the top channel 35 carries a top tacking strip 37. The top channel 35 and consequently the top tacking strip 37 have outward extremities which curve downwardly and meet the ends of the rearwardly curving extremities of the front channel 34 and the front tacking strip 36, as is best shown in Figs. 10 and 11.

The top tacking strip 37 is held in the channel 35 by fingers 38 integrally formed on the rear wall 35a of said channel 35 and bent over said top tacking strip 37, as is best shown in Figs. 10 and 11. Similarly, the front tacking strip 36 is held in the channel 34 with the aid of a plurality of upwardly bent fingers 39 provided on the bottom wall of the channel 34 as is best shown in Figs. 4, 5 and 6. The front edge of the foldable top 26 is connected to the front tacking strip 36 with the aid of tacks 40 and of a weatherstrip 41 covering said connection. To the top tacking strip 37 there is similarly secured a weatherstrip 42 providing a weather seal between the header 25 and the foldable top 26 in the locked position of the header.

Along the upper front edge of the windshield member 23 there is secured a resilient, preferably a rubber strip 43, the ends of which curve rearwardly as can be best understood from an examination of Fig. 6. Along the rear upper edge of the member 23 there is provided a second rubber strip 44. In the closed position of the top header 25, such as is illustrated in Fig. 5, the bottom surface thereof contacts said rubber strips 43 and 44 and presses against the same to form a double seal between the top header 25 and the windshield member 23. The windshield member 23 also carries members or moldings 45 and 46 secured to said member in any suitable manner and providing an ornamentation and an additional seal between the rubber strip 24 and windshield member 23.

The locking means carried within the header 25 comprises a central member 50 having a wedge end 50a adapted to enter a wedge depression 29a provided in the central dowel 29. The central member 50 is reciprocated in a predetermined path extending longitudinally of the vehicle, the reciprocating movements of said member being effected with the aid of a screw 51 engaging an internally threaded hole provided in said member 50. The screw 51 is, in turn, actuated with the aid of a handle 31 connected to said screw 51 and arranged outside of the header 25 within the reach of the driver. The central member 50 is provided with wings 53 to which there are hingedly connected the ends of the two bell cranks 54, which bell cranks are, in turn, hingedly secured to a reinforcing bracket 55 as indicated at 56. The opposite ends of said bell cranks 54 are hingedly connected, as indicated at 57, to the inner ends of two locking rods 58 extending outwardly from the central member 50 toward the outer dowels 27. The locking rods 58 are provided with wedge ends 58a adapted to enter corresponding wedge depressions 27a of the outer dowels 27. Near the ends of said locking rods 58 there are provided two supporting guides 59 secured to the header lower member 33 and adapted to guide said locking rods in their predetermined path and to prevent bending of the rods due to the reaction of the outer dowels 27. It can be clearly seen from an examination of the drawings that wear of the wedge members may slightly change the stroke of the wedge members but will not produce any rattles in the mechanisms. In order to prevent rattling of the locking rods 58 in their locked or unlocked positions, two anti-rattle springs 60 are provided. In the present embodiment of the invention said springs are of the strip type and they are riveted to the rods 58, as is best shown in Figs. 3 and 8. The locking rods 58 are preferably of a hollow construction, as is best shown in Figs. 8 and 9. To the lower or rear piece 33 of the header 25 there are secured with the aid of screws 61 pieces 62 having central flanged openings 63 registering with said holes 28 and adapted to receive the dowels 27. Said pieces 62 may be finished to serve ornamentation purposes. It is preferable to nickel plate or chrome plate the same.

The dowels 27 and 29 are secured to the windshield member 23 in any suitable manner. One of the preferred constructions of the dowel may include a forged dowel having flanges at its lower portion, with which it is riveted to the upper wall of said windshield member 23. A piece 64 similar in its function to outer pieces 62 is secured at the lower surface of the header 25 to receive a central dowel 29.

In operation, when it is desired to close the foldable top, the same is brought forward into the position indicated in Fig. 1 either manually or with the aid of power means, and the openings in the header 25 are brought over the dowels 27 and 29, whereupon the header is pressed downward to cause said dowels to enter said openings. Thereupon the handle 31 is manually rotated to cause forward movement of the central member 50 as well as outward movements of the locking rods 58. The wedge end of the central member 50 and the wedge ends of the locking rods 58 enter the wedge depressions of the dowels 27 and 29 and as rotation of the handle 31 is continued, the header 25 is pressed tightly down.

The above described operation may be best understood from an examination of Figs. 4, 5, and 6. In Fig. 4 the header 25 is shown in position when it is about to be pushed downward by the action of the central member 50. In Fig. 5 the header 25 is shown in its downward position compressing the rubber strips 43 and 44.

By virtue of the above described construction, there is thus provided an improved motor vehicle convertible body having a foldable top which can be brought forward and locked to the windshield of the vehicle in a simplified manner. The locking means provided in the foldable top are entirely concealed within the header 25 and do not have mechanical parts or mechanism protruding outside of the header, which may be unsightly and dangerous. The locking operation requires only a few turns of the handle 52, is extremely simple and does not require any skill whatsoever. The unlocking operation is just as simple and it requires several turns of the handle 52 in the reverse direction to raise the header 25 preparatory to shifting the foldable top to the rear of the vehicle.

We claim:

1. In a vehicle body, a windshield having a header, a movable top terminating at its front end in a rigid transverse member, said header having at an intermediate point and at opposite ends three upstanding studs adapted to enter apertures in said member, three locking devices carried by said member including two devices shiftable transversely of the body and an intermediate device shiftable longitudinally of the body, said studs having recesses into which said devices are adapted to enter and said recesses and devices having surfaces slidingly engageable to exert wedging action and to draw down said transverse member against said header, means for shifting said intermediate device longitudinally, and bell crank levers pivotally connecting said intermediate device to said transversely shiftable devices.

2. In a vehicle body, a windshield having a header, a movable top terminating at its front end in a rigid transverse member, said header having at an intermediate point and at opposite ends three upstanding studs adapted to enter apertures in said member, three locking devices carried by said member including two devices shiftable transversely of the body and an intermediate device shiftable longitudinally of the body, said studs having recesses into which said devices are adapted to enter and said recesses and devices having surfaces slidingly engageable to exert wedging action and to draw down said transverse member against said header, a pair of two-arm levers each pivoted to the header intermediate its ends, one arm of each lever being pivoted to said longitudinally shiftable device and the other arm being pivoted to one of said transversely shiftable devices and said levers adapted to simultaneously shift said last mentioned devices transversely upon shifting said other device longitudinally.

3. In a vehicle body, a windshield structure, a foldable top, a header secured to said foldable top and adapted to be connected to said windshield structure, three dowels arranged on said windshield structure and adapted to enter a corresponding plurality of openings in said header, locking means housed within said header and including a central wedge member and two rods all having inclined wedge-shaped ends, said central wedge member being shiftable longitudinally of the body and said rod ends being shiftable transversely of the body to slidingly engage surfaces on said dowels to draw down and lock said header to the windshield, and levers pivotally mounted on the windshield structure to swing about vertical axes and connecting said wedge member and rods for transmitting motion to said rods upon shifting the wedge member longitudinally of the body.

4. In a vehicle body, a windshield structure, a foldable top, a header secured to said foldable top and adapted to be connected to said windshield structure, three dowels arranged on said windshield structure and adapted to enter a corresponding plurality of openings in said header, locking means housed within said header and including a central locking member and two rods terminating in locking devices, said central locking member being shiftable longitudinally of the body and said rods being shiftable transversely of the body to cause said locking devices to slidingly engage surfaces on said dowels to draw down and lock said header to the windshield, levers pivotally mounted on the windshield structure to swing about vertical axes and connecting said central locking member and rods for transmitting motion to said rods upon shifting the central locking member longitudinally of the body, and a rotatable handle connected to said central locking member for shifting the same.

5. In a vehicle body, a windshield structure, a foldable top, a header secured to said foldable top and adapted to be connected to said windshield structure, locking means carried by said header and adapted to lock positively said header to said windshield structure, said means including a locking device at the central portion of the header and two locking devices at opposite ends of the header, the central locking device being bodily slidable forwardly of the body to engage a fixed member on the windshield structure and the end locking devices being bodily slidable in opposite directions outwardly of the body to engage fixed members on the windshield structure, a pair of bell crank levers pivotally mounted on the windshield structure to swing about vertical axes and each pivotally connecting said central locking device with one of said end locking devices to transmit motion to the latter from the central locking device.

6. In a vehicle body, a windshield structure, a foldable top, a hollow header secured to said foldable top and adapted to be connected to said windshield structure, locking means permanently housed within said header and adapted to lock positively said header to said windshield structure, said means including a locking device at the central portion of the header and two locking devices at opposite ends of the header, the central locking device being bodily slidable forwardly of the body to engage a fixed member on the windshield structure and the end locking devices being bodily slidable in opposite directions outwardly of the body to engage fixed members on the windshield structure, a pair of bell crank levers pivotally mounted on the windshield structure to swing about vertical axes and each pivotally connecting said central locking device with one of said end locking devices to transmit motion to the latter from the central locking device, and a rotatable handle connected to said central locking device for shifting the same in one direction or the other.

TRYGVE VIGMOSTAD.
SOREN N. JUUL.